(12) United States Patent
Hamade et al.

(10) Patent No.: US 10,064,241 B2
(45) Date of Patent: Aug. 28, 2018

(54) DYNAMICALLY ENABLED WI-FI

(71) Applicant: T-Mobile USA, Inc., Bellevue, WA (US)

(72) Inventors: Nayla Hamade, Bellevue, WA (US); Omar Hassan, Kirkland, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 108 days.

(21) Appl. No.: 13/741,357

(22) Filed: Jan. 14, 2013

(65) Prior Publication Data

US 2013/0208713 A1 Aug. 15, 2013

Related U.S. Application Data

(60) Provisional application No. 61/599,304, filed on Feb. 15, 2012.

(51) Int. Cl.

| H04W 36/36 | (2009.01) |
|---|---|
| H04W 36/14 | (2009.01) |
| H04W 52/02 | (2009.01) |
| H04W 88/08 | (2009.01) |
| H04W 36/00 | (2009.01) |
| H04W 48/18 | (2009.01) |

(52) U.S. Cl.
CPC ....... *H04W 88/08* (2013.01); *H04W 36/0022* (2013.01); *H04W 36/14* (2013.01); *H04W 48/18* (2013.01); *H04W 52/028* (2013.01)

(58) Field of Classification Search
CPC . H04W 36/0022; H04W 36/16–36/22; H04W 36/24–36/32; H04W 52/0274–52/0283

USPC .......................... 370/331–334; 455/436–444
See application file for complete search history.

(56) References Cited

U.S. PATENT DOCUMENTS

| 2004/0081120 A1* | 4/2004 | Chaskar ............. H04L 12/5865 370/328 |
|---|---|---|
| 2005/0130662 A1* | 6/2005 | Murai .................... H04J 11/004 455/444 |
| 2006/0008256 A1* | 1/2006 | Khedouri et al. ............ 386/124 |

(Continued)

FOREIGN PATENT DOCUMENTS

KR          100681517 B1 *  2/2007  ............... H04B 1/40

OTHER PUBLICATIONS

Lee, Machine Translation of KR 100681517 B1, Feb. 9, 2007, 14 pages.*

(Continued)

*Primary Examiner* — Hoon J Chung
(74) *Attorney, Agent, or Firm* — Lee & Hayes, PLLC (57) ABSTRACT

The described implementations provide devices, systems, and methods that offload the usage of a cellular network using dynamic selection of broadband network connections such as wireless LAN (Wi-Fi) access points. A Wi-Fi transceiver on a mobile device may be activated when certain conditions (e.g., trigger events) are met. These conditions may include when, for instance, a cellular signal is dropped to 2G, weak or no cellular coverage is detected, a data use limit has been reached, an associated device is in domestic or international roaming or a particular location, and/or an associated device is in a saved private network area.

20 Claims, 3 Drawing Sheets

(56) References Cited

U.S. PATENT DOCUMENTS

| | | | | |
|---|---|---|---|---|
| 2006/0246903 | A1* | 11/2006 | Kong | H04M 1/2535 |
| | | | | 455/437 |
| 2007/0076662 | A1* | 4/2007 | Jain | H04W 36/26 |
| | | | | 370/331 |
| 2007/0191056 | A1* | 8/2007 | Karaoguz et al. | 455/552.1 |
| 2009/0291686 | A1* | 11/2009 | Alpert | H04W 36/0083 |
| | | | | 455/436 |
| 2010/0150102 | A1* | 6/2010 | Li et al. | 370/331 |
| 2010/0273487 | A1* | 10/2010 | Alonso-Rubio et al. | 455/436 |
| 2011/0286437 | A1* | 11/2011 | Austin | H04W 4/02 |
| | | | | 370/338 |
| 2012/0064901 | A1* | 3/2012 | Zhu | H04W 24/02 |
| | | | | 455/450 |
| 2012/0099562 | A1* | 4/2012 | Smadi | H04W 36/08 |
| | | | | 370/332 |

OTHER PUBLICATIONS

Aruba Networks, Aruba's Mobile Voice Continuity (MVC) Solution—Technical Overview, 2007 (dated Sep. 23, 2009 on Wayback Machine), 14 pages.*

* cited by examiner

DYNAMICALLY ENABLED WI-FI

RELATED APPLICATIONS

This application claims domestic priority of Provisional Application No. 61599304, filed on Feb. 15, 2012. The entire contents of the Provisional Application are hereby incorporated herein by reference.

BACKGROUND

The use of mobile devices such as cellular telephones, etc. is proliferating. Almost everyone has some sort of mobile device, and some people have multiple devices. Users can access several different networks using a single mobile device, and can access voice, text, and multimedia data from other network entities such as servers and other mobile devices. Further, mobile device complexity is increasing, with more and more advanced and power-efficient processors, display interfaces, and applications to provide a user experience like never before. Consequently, users are using their mobile devices more frequently, and have larger bandwidth requirements for data, email, voice, etc.

This increased usage puts a tremendous strain on cellular networks that provide communication services. Even with the advent of 3G and 4G networks that use Internet Protocol (IP) addressing, Session Initiation Protocol (SIP), etc., there are certain network elements that get overwhelmed and create a bottleneck for data flow, such as cellular base stations (or Node Bs) and their associated gateways. Several users within the range of one or more base stations who are downloading high-volume data from the network will have greater transmission power requirements from the base station. This may cause reduced signal strength per mobile device, and consequently a lower quality connection. Transmission power control can alleviate some but not all of these issues. This further causes higher battery usage by the mobile device.

Network operators generally offer alternative means to connect to their core networks, or to the Internet. Femtocells, Fiber-to-the-node (FTTN), and wireless local area network (WLAN or Wi-Fi) access points can provide access to various networks for mobile devices having more than one type of transceiver. For instance, wireless devices often include a Wi-Fi transceiver. A Wi-Fi hotspot/access point can be used to connect to a network, with broadband speeds, thereby the load on the cellular network can be reduced. However, there are specific issues that prevent the efficient selection of an access point. For instance, users may disable Wi-Fi due to either a) concerns over battery life, or b) to avoid the annoying messages to connect to Wi-Fi every time an open access point is detected. Consequently, users often do not enable Wi-Fi as they may forget to turn it off afterwards. Leaving it on leads to rapid battery drainage, and leaving it off leads to connectivity issues as well as suboptimal power usage as the cellular transceiver may have to use more power for high-throughput communication with a base station. Furthermore, constant user interaction with a connection manager to enable/disable the Wi-Fi transceiver does not provide for a seamless and streamlined user experience.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

DETAILED DESCRIPTION

The described implementations provide devices, systems, and methods that offload the usage of a cellular network using dynamic selection of broadband network connections such as wireless LAN (Wi-Fi) access points. A Wi-Fi transceiver on a mobile device may be activated when certain conditions are met. These conditions may include when, for instance, a cellular signal is dropped to 2G, weak or no cellular coverage, a data use limit has been reached, an associated device is in domestic or international roaming or a particular location, and/or an associated device is in a saved private network area, etc.

When one or more of the foregoing conditions is satisfied, the location of the mobile device may be correlated with a database of known locations in which one or more Wi-Fi access points are determined to exist. The Wi-Fi transceiver on the mobile device may be activated and instructed to connect to a particular Wi-Fi access point. The database of known locations and corresponding Wi-Fi access points may be populated by a variety of methods including but not limited to adding access points owned and operated by the operator of the cellular network, collecting usage information of other access points as reported by a plurality of mobile devices, and so on.

To elaborate the above, dynamically establishing a Wi-Fi connection may be triggered by a determination of low signal strength of the cellular base stations or towers that provide service to the mobile device, by usage of a high-bandwidth application such as multimedia streaming, or by other triggers. Intelligence associated with the device or network provider may ensure that the appropriate connection method is used, and may minimize handovers to networks or access points that are unreliable or that are predicted to become inaccessible to the mobile device. Furthermore, such intelligence may operate by monitoring the time, location of the mobile device, type of mobile device, data usage of the mobile device, and other factors. The intelligence may be implemented by the mobile device, on a server associated with the network, or any combination thereof.

Mobile device or user device, as used herein and throughout this disclosure, refers to any electronic device capable of wirelessly sending and receiving data. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

Mobile devices may communicate with each other and with other elements via a network, for instance, a wireless network, or a wireline network. A network may include broadband wide-area networks such as cellular networks, local-area networks (LAN), Wi-Fi, and personal area networks, such as near-field communication (NFC) networks including BLUETOOTH®. Communication across a network may be packet-based; however, radio and frequency/amplitude modulation networks may enable communication between communication devices using appropriate analog-digital-analog converters and other elements. Communication is enabled by hardware or mixed hardware and software elements called transceivers. Mobile devices may have more than one transceiver, capable of communicating over different networks. For example, a cellular telephone may include a cellular transceiver for communicating with a cellular base station, a Wi-Fi transceiver for communicating with a Wi-Fi network, and a BLUETOOTH® transceiver for communicating with a BLUETOOTH® device. A Wi-Fi network is accessible via access points such as wireless routers, etc., that communicate with the Wi-Fi transceiver to send and receive data. The Wi-Fi network may further be connected to the internet or other packet-based networks. The bandwidth of a network connection or an access point is a measure of the rate of data transfer, and can be expressed as a quantity of data transferred per unit of time.

A network typically includes a plurality of elements that host logic or intelligence for performing tasks on the network. The logic can be hosted on servers. In modern packet-based wide-area networks, servers may be placed at several logical points on the network. Servers may further be in communication with databases and can enable communication devices to access the contents of a database. Billing servers, application servers, etc. are examples of such servers. A server may include several network elements, including other servers, and can be logically situation anywhere on a service provider's network, such as the back-end of a cellular network. A server hosts or is in communication with a database hosting an account for a user of a mobile device. The user account includes several attributes for a particular user, including a unique identifier of the mobile device(s) owned by the user, relationships with other users, application usage, location, personal settings, business rules, bank accounts, and other information. A server may communicate with other servers on different networks to update a user account.

A location, as used herein and throughout this disclosure, may be any physical location that is served by one or more networks. A mobile device has a location that can be determined via a plurality of methods such as Global Positioning System (GPS), Assisted GPS (A-GPS), cell tower triangulation, RF signatures, etc. A location may be determined using radio-location via signal measurement from base stations/cell towers, using GPS/A-GPS, or using proximity to NFC transceivers. The area of the location may be controlled by the number and range of the NFC transceivers. Determining a location as a function of time enables a measurement of rate of movement, or speed.

Figure 1:
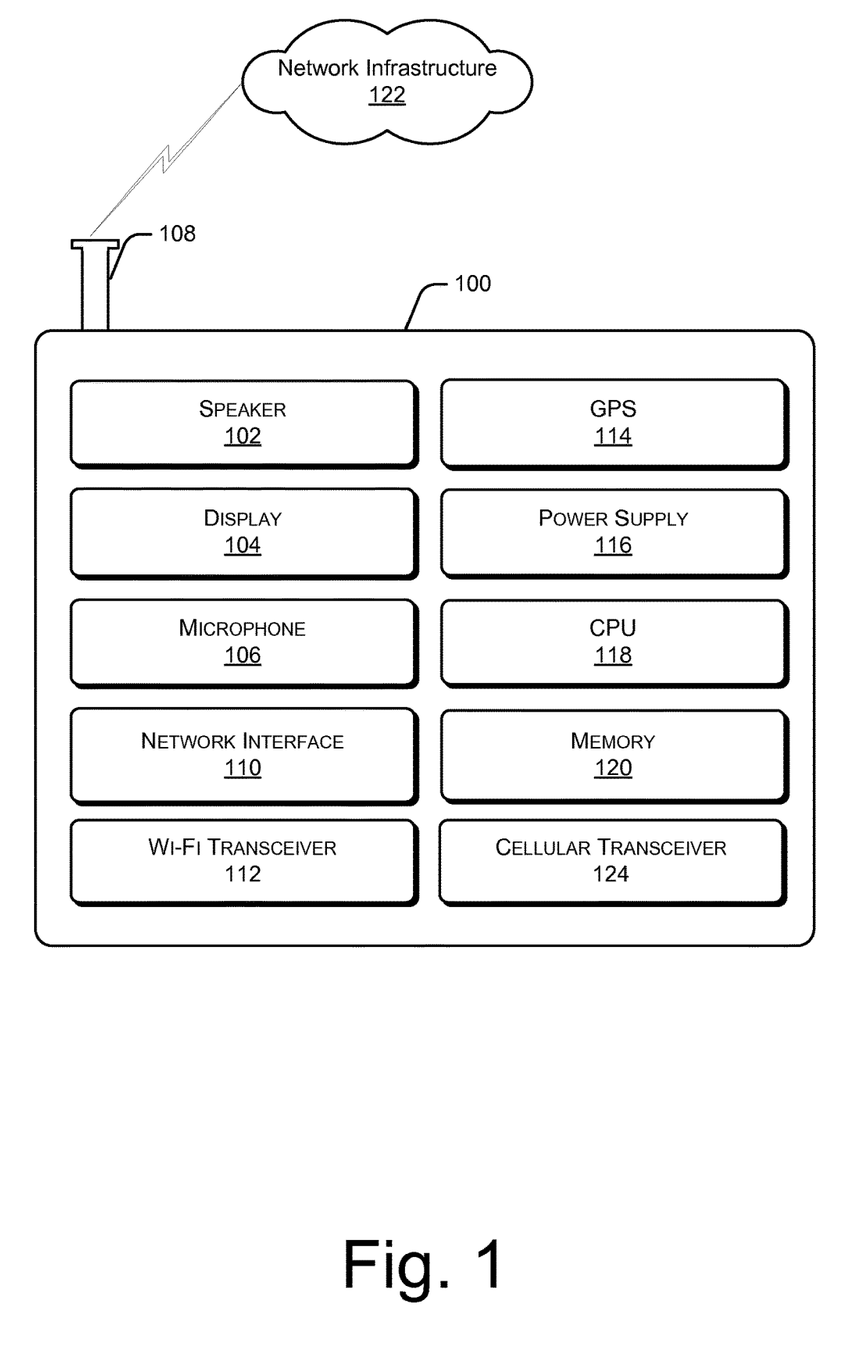
FIG. 1 illustrates components of a mobile device, according to an exemplary embodiment.

FIG. 1 illustrates components of a mobile device 100, according to an exemplary embodiment. The mobile device 100 may include a speaker 102, a display 104, a microphone 106, and an antenna 108. The mobile device 100 may further include a network interface 110, a Wi-Fi transceiver 112, a Global Positioning System (GPS) receiver 114, a power supply 116, a central processing unit (CPU) 118, and a memory 120. Furthermore, the mobile device 100 may include a cellular transceiver 124.

The speaker 102 provides an audio output for the mobile device 100. The display 104 may be an LCD or LED or other type of display on which a user can view selections, numbers, letters, etc. The display 104 may also be a touchscreen, thereby being used as an input device. In embodiments not using a touchscreen, a keypad is typically used as an input device, for instance, to type a phone number or a message. Such a keypad may be a numerical keypad, a QWERTY keyboard, etc. The microphone 106 allows the user to verbally communicate with others using mobile device 100. The antenna 108 is a transducer designed to transmit or receive electromagnetic waves to and from a network 122. In conjunction with the antenna 108, the network interface 110 allows mobile device 100 to wirelessly communicate with network 122, such as a cellular network and/or an access point, or with other wireless devices across the network 122. The network 122 may include, but is not limited as such, operator equipment necessary to enable mobile devices to communicate using cellular communication technology and protocols.

The network interface 110 may be a cellular transceiver, wireless transceiver, etc., and may include combinations of transceivers to communicate with assorted wireless networks. Alternatively, the network interface may 110 couple one or more transceivers of the mobile device 100 to one or more communication networks. The Wi-Fi transceiver 112 enables mobile device 100 to wirelessly communicate over short ranges with a Wi-Fi access point, and through the access point, to a packet-based network such as the Internet, and other devices on the internet. The GPS transceiver 114 enables a determination of a location of mobile device 100, by receiving signals from a GPS satellite. In addition to these signals, network interface 110 can receive assistance data from an A-GPS server on the cellular network, thereby enabling GPS receiver 114 to get a faster fix on a satellite signal. The power supply 116 provides power to each of the components of mobile device 100, and can include a battery, as well as an interface to an external power supply. The CPU 118 controls components of mobile device 100 according to instructions stored in the memory 120.

The memory 120 may be any computer readable medium, such as RAM, ROM, etc. The memory 120 may store intelligence, such as computer readable instructions, in addition to logic for operating the components of mobile device 100. The memory 120 further may store a database including a set of rules such as triggers defining when the Wi-Fi transceiver 112 needs to be activated or deactivated, as well as a database of Wi-Fi access points. The contents of database can be provisioned by an operator of the cellular network, or can be added to based on usage of mobile device 100 as it accesses various access points in different locations. Such a database may also be stored wholly or partly by the cellular network.

The mobile device 100, aided by instructions stored in memory 120 and executed by the CPU 118, may monitor a plurality of conditions that determine whether or not Wi-Fi transceiver 112 should be activated, and whether or not mobile device 100 should communicate over a Wi-Fi network as opposed to a cellular network. There are several conditions and combinations of conditions that trigger and enable the selection of Wi-Fi access points for data and/or voice communications.

The conditions that may enable the selection of Wi-Fi access points are as follows, but they are not provided in a particular order or intended to be a complete list. A user or network programmable time schedule may be referred to determine when the Wi-Fi transceiver 112 will be activated and used to connect to a Wi-Fi access point. A trigger to connect to a Wi-Fi access point may use RF assisted activation. RF assisted activation of the Wi-Fi transceiver 112 may consider cellular signals received by the network interface 110. RF assisted activation may be measured by the network interface 110, since the network interface 110 often seeks out signals from cell towers that serve the area that the mobile device 100 is currently operating. As the network interface 110 scans for cellular signals, it also receives signal strength, a timing, and a certain amount of noise with the signal. Therefore, the Wi-Fi transceiver 112 may be enabled when the RF assisted activation information indicates reception of 2G signals, or weak or no cellular coverage. In one implementation, a cellular signal is considered weak when Received Signal Strength Indicator (RSSI) indicates that the cellular signal is at or below −100 dBm for a predetermined amount of time (e.g. 10, 20, or 30 seconds).

In alternative implementations, the Wi-Fi transceiver 112 may be activated when available Wi-Fi access points are detected. The Wi-Fi transceiver 112 may be deactivated and regular cellular transmission via network interface 110 resumed for data communications when Wi-Fi access points are no longer available. Implementations may also provide for automatic refreshing of a list of access points from a server on the network. Locally stored lists can be purged and replaced with updated lists at fixed intervals, for instance, hours, days or months. The Wi-Fi transceiver 112 may be activated when the mobile device 100 is in roaming mode (domestic or international), and then, after the roaming condition has passed, the Wi-Fi transceiver 112 may be deactivated and regular local cellular data transmission via the network interface 110 may be resumed. Furthermore, the Wi-Fi transceiver 112 may be activated when the mobile device 100 determines that data use via the cellular network has reached or is near an allocated maximum, and then Wi-Fi transceiver 112 may be deactivated and regular local cellular transmission via the network interface 110 may be resumed once it is determined that data use via the cellular network is no longer close to the allocated maximum.

In alternative embodiments, once the Wi-Fi transceiver 112 is enabled and connected to a Wi-Fi access point, or before the Wi-Fi transceiver 112 is enabled and connected to a Wi-Fi access point, it is determined if voice communications should be enabled using the Wi-Fi transceiver 112. In one example, the RF assisted activation is used to determine if the Wi-Fi transceiver 112 should be used for voice communications. In an implementation, the Wi-Fi transceiver 112 is used for voice when the RF assisted activation information indicates weak or no cellular coverage. In another example, the Wi-Fi transceiver 112 may be used for voice when the access point is a known private Wi-Fi network. In another example, the Wi-Fi transceiver 112 may be used for voice when the mobile device 100 is roaming (international or domestic). In another example, the Wi-Fi transceiver 112 may be used for voice when the mobile device 100 determines that the user's voice minute allotment is at or near an allotted maximum (e.g., 90% of allotted minutes used). In yet another example, the Wi-Fi transceiver 112 may be used for voice based on reporting information or statistics associated with available Wi-Fi access points, their signal strengths, ranking and/or availability. Such information may be transmitted to the network from a plurality of mobile devices, and this information may be used to build up the database of access points. Further, access points may be ranked in such a database or databases based on a performance grade as measured by the mobile devices and/or set by the network. Such database information may be conveyed to the mobile device 100 to enable efficient connectivity to Wi-Fi access points for voice communication.

Figure 2:
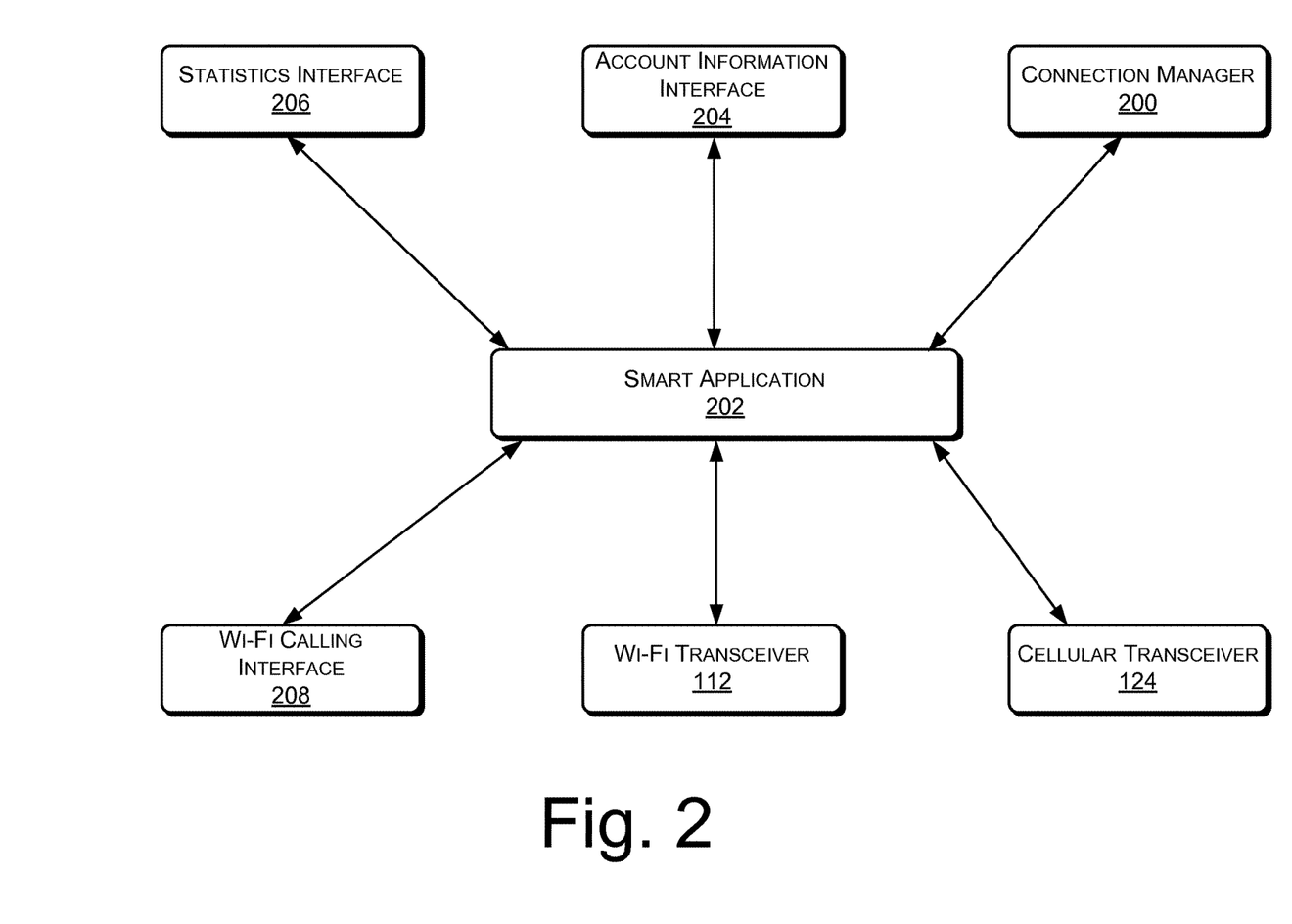
FIG. 2 shows particular components of a mobile device, such as the mobile device illustrated in FIG. 1, according to an exemplary embodiment, which may be used to implement functionalities for dynamically enabling Wi-Fi.

In an alternative embodiment, a connection manager 200, shown in FIG. 2, may be implemented by the mobile device 100. The connection manager 200 may be implemented by executing instructions stored in memory 120. Alternatively, the connection manager 200 may be implemented by unique logic associated with the mobile device 100. The connection manager 200 may be designed to enable the mobile device 100 to connect to a Wi-Fi network (access point), where such a Wi-Fi network may be one of many Wi-Fi networks in a geographical area. To that end, a list of preferred access points may be stored in the mobile device 100. The list of preferred access points may include highest-ranked access points, based on prior determined signal strength, security level, privacy, etc. More particularly, access points may be ranked based on a performance grade as measured by the mobile devices.

The connection manager 200 may grade/rank access points using, for instance, a qualification factor that is a combination of historical data about the particular access point, combined with the quality of the signal of the access point at the present time. The access points can be ranked based on this factor, and the rank can be stored locally in the mobile device 100 and/or submitted to a server on the network to be made available to other mobile devices that happen upon the same location at a future time. This could also be extended to access points that are not operated by the network operator, such as unlicensed mobile access points, public Wi-Fi, etc. Such access points may also associated with the specific location, graded based on a qualification factor, and added to the database. Nonetheless, the connection manager 200 may be designed to consider some or all of such foregoing information in the process of selecting an access point.

FIG. 2 shows various components of a mobile device, such as the mobile device 100, according to an exemplary embodiment, which may be used to implement the foregoing described functionalities for dynamically enabling Wi-Fi connectivity. Various components illustrated may be implemented using computer executable instructions stored in memory and/or implemented in hardware.

In one implementation, a smart application 202 is provided and implemented by the mobile device 100. The smart application 202 may be implemented by the mobile device 100 by executing computer executable instructions stored in memory 120 and executed by the CPU 118. Alternatively or in addition, the smart application 202 may be embodied in an application specific processor designed to realize the functionalities of the smart application 100.

The smart application 202 may be coupled to and/or communicate with various elements of the mobile device 100. Furthermore, the smart application 202 may be coupled to and/or communicate with various elements of the network 122. Therefore, the smart application 200 is enabled to communicate with at least the elements of the mobile device 100 and the network 122.

The connection manager 200 may be coupled to the smart application 202. Furthermore, an account information interface 204, a statistics interface 206, a Wi-Fi calling interface 208, the Wi-Fi transceiver 112 and the cellular transceiver 124 may be communicatively coupled to the smart application 202. Similar to the smart application 202, each of the at least the account information interface 204, the statistics interface 206, and the Wi-Fi calling interface 208 may be implemented by the mobile device 100 by executing computer executable instructions stored in memory 120 and executed by the CPU 118. Alternatively or in addition, each of the at least the account information interface 204, the statistics interface 206, and the Wi-Fi calling interface 208 may be embodied in an application specific processor designed to realize the functionalities thereof.

The connection manager 200 may be designed to enable the mobile device 100 to connect to a Wi-Fi network (access point), where such a Wi-Fi network may be one of many Wi-Fi networks in a geographical area. In general, the connection manager 200 may receive instructions from the smart application 202. Such instructions my cause the connection manager 200 to enable and or disable the Wi-Fi transceiver 112 such that data and/or voice communications are processed using the Wi-Fi transceiver 112. Furthermore, in accordance with instructions provided by the smart application 202, the connection manager 200 may enable or disable the cellular transceiver 124 for data and/or voice communications. The smart application 202, in one implementation, may act as a conduit that allows the connection manager 200 to manage the Wi-Fi transceiver 112 and the cellular transceiver 124.

The cellular transceiver 124 may provide the smart application 124 with cellular events (triggers) that enable the smart application 202 ascertain if the Wi-Fi transceiver 112 should be dynamically enabled. For example, the cellular transceiver 124 may provide RF assisted activation information to the smart application 124, which may be used by the smart application 124 to determine if the Wi-Fi transceiver 112 should be dynamically enabled. For example, the cellular transceiver 124, assisted by the network interface 110, often seeks out signals from cell towers that serve the area that the mobile device 100 is currently operating. As the network interface 110 scans for cellular signals, it also receives signal strength information, timing, and a certain amount of noise with the signal. Therefore, the Wi-Fi transceiver 112 may be enabled by the smart application 202 when the RF assisted activation information indicates reception of 2G signals, or weak or no cellular coverage. In one implementation, a cellular signal is considered weak when the RSSI indicates that the cellular signal is at or below −100 dBm for a predetermined amount of time (e.g., 10, 20, or 30 seconds). In another implementation, the Wi-Fi transceiver 112 may be enabled by the smart application 202 when the RF assisted activation information indicates that cellular coverage has been lost for a predetermined time period (e.g., 30 seconds).

The account information interface 204 may provide the smart application 202 with network usage events (triggers) that enable the smart application 202 ascertain if the Wi-Fi transceiver 112 should be dynamically enabled. The account information interface 204 may gather such network usage events from mobile device usage history provided by the network 122 and/or mobile device usage history obtained directly by the account information interface 204. For example, the Wi-Fi transceiver 112 may be activated, by the smart application 202, when the mobile device 100 determines that data use via the cellular network has reached or is near an allocated maximum (e.g., data or minutes limit(s)), and then the Wi-Fi transceiver 112 may be deactivated, by the smart application 202, and regular local cellular transmission via the network interface 110 may be resumed once it is determined that data use via the cellular network is no longer close to the allocated maximum.

The connection manager 200 may be designed to provide the smart application 202 with information events (triggers) that enable the smart application 202 to ascertain if the Wi-Fi transceiver 112 should be dynamically enabled. A list of preferred access points may be stored in the mobile device 100. The list of preferred access points may include highest-ranked access points, based on prior determined signal strength, security level, privacy, etc. More particularly, access points can be ranked based on a performance grade as measured by the mobile devices. The connection manager 200 may obtain location information from the GPS 114 and instruct the smart application 202 to enable the Wi-Fi transceiver 112 if one or more of the preferred access points is available in an operational area of the mobile device 100.

The connection manager 200 may grade/rank access points using, for instance, a qualification factor that is a combination of historical data about the particular access point, combined with the quality of the signal of the access point at the present time. The access points can be ranked based on this factor, and the rank can be stored locally in the mobile device 100 and/or submitted to a server on the network to be made available to other mobile devices that happen upon the same location at a future time. This could also be extended to access points that are not operated by the network operator, such as unlicensed mobile access points, public Wi-Fi, etc. Such access points may also associated with the specific location, graded based on a qualification factor, and added to the database. Nonetheless, the connection manager 200 may be designed to consider some or all of such foregoing information in the process of selecting an access point. Historical data about access points, to include grade and ranking information, may be provided by the statistics interface 206.

Once the Wi-Fi transceiver 112 is enabled and connected to a Wi-Fi access point, or before the Wi-Fi transceiver 112 is enabled and connected to a Wi-Fi access point, the connection manager 200 may determine if voice communications should be enabled using the Wi-Fi transceiver 112. In one example, the RF assisted activation is used to determine if the Wi-Fi transceiver 112 should be used for voice communications. In an implementation, the Wi-Fi transceiver 112 is used for voice when the RF assisted activation information indicates weak or no cellular coverage. In another example, the Wi-Fi transceiver 112 may be used for voice when the access point is a known private Wi-Fi network. In another example, the Wi-Fi transceiver 112 may be used for voice when the mobile device 100 is roaming (international or domestic). In another example, the Wi-Fi transceiver 112 may be used for voice when the connection manager 100 determines, aided by the accounting information interface 204, that the user's voice minute allotment is at or near an allotted maximum. In yet another example, the Wi-Fi transceiver 112 may be used for voice based on reporting information or statistics associated with available Wi-Fi access points, their signal strengths, ranking and/or availability. Such reporting information and statistics may be provided by the statistics interface 206. Furthermore, such information may be transmitted to the network from a plurality of mobile devices, and this information may be used to build or augment the database of access points. Further, access points may be ranked in such a database or databases based on a performance grade as measured by the mobile devices and/or set by the network. Such database information may be conveyed to the mobile device 100 to enable efficient connectivity to Wi-Fi access points for voice communication. Voice over Wi-Fi functionality is provided by the Wi-Fi calling interface 208.

The connection manager 200 may disable the Wi-Fi transceiver 112, after one or more trigger events are determined and the Wi-Fi transceiver 112 was enabled, if the Wi-Fi transceiver 112 is unable to connect to an access point. The connection manager 200 may delay disabling the Wi-Fi transceiver 112 for a predetermined number of minutes (e.g., 10 minutes) after it is determined that the Wi-Fi transceiver 112 has not connected to an access point. The connection manager 200 may disable dynamic event triggered Wi-Fi connectivity when the battery (e.g., power supply 116) is less than a configurable threshold (e.g., remaining battery power is at or less than 25%). In another implementation, the connection manager 200 may disable dynamic event triggered Wi-Fi connectivity when the Wi-Fi transceiver 112 has been disabled manually by way of a user interface associated with the mobile device or by a network operator, or the like. The connection manger 200, however, may enable dynamic event triggered Wi-Fi connectivity a predetermined time period (e.g., 3 hours) after the Wi-Fi transceiver 112 was manually disabled. Furthermore, the connection manager may enable the Wi-Fi transceiver 112 when it is determined that the mobile device is in the vicinity of a known access point. The vicinity may be determined using the GPS (e.g., GPS 114) and/or cell ID/sector information obtained from signals transmitted by the network (e.g., network 122). The connection manager 200 may disable dynamic event triggered Wi-Fi connectivity when it is detected that the mobile device is moving at a speed greater than a configurable speed threshold (e.g., 7 MPH) and/or if the mobile device has moved outside a configurable radius (e.g., 200 ft.).

Figure 3:
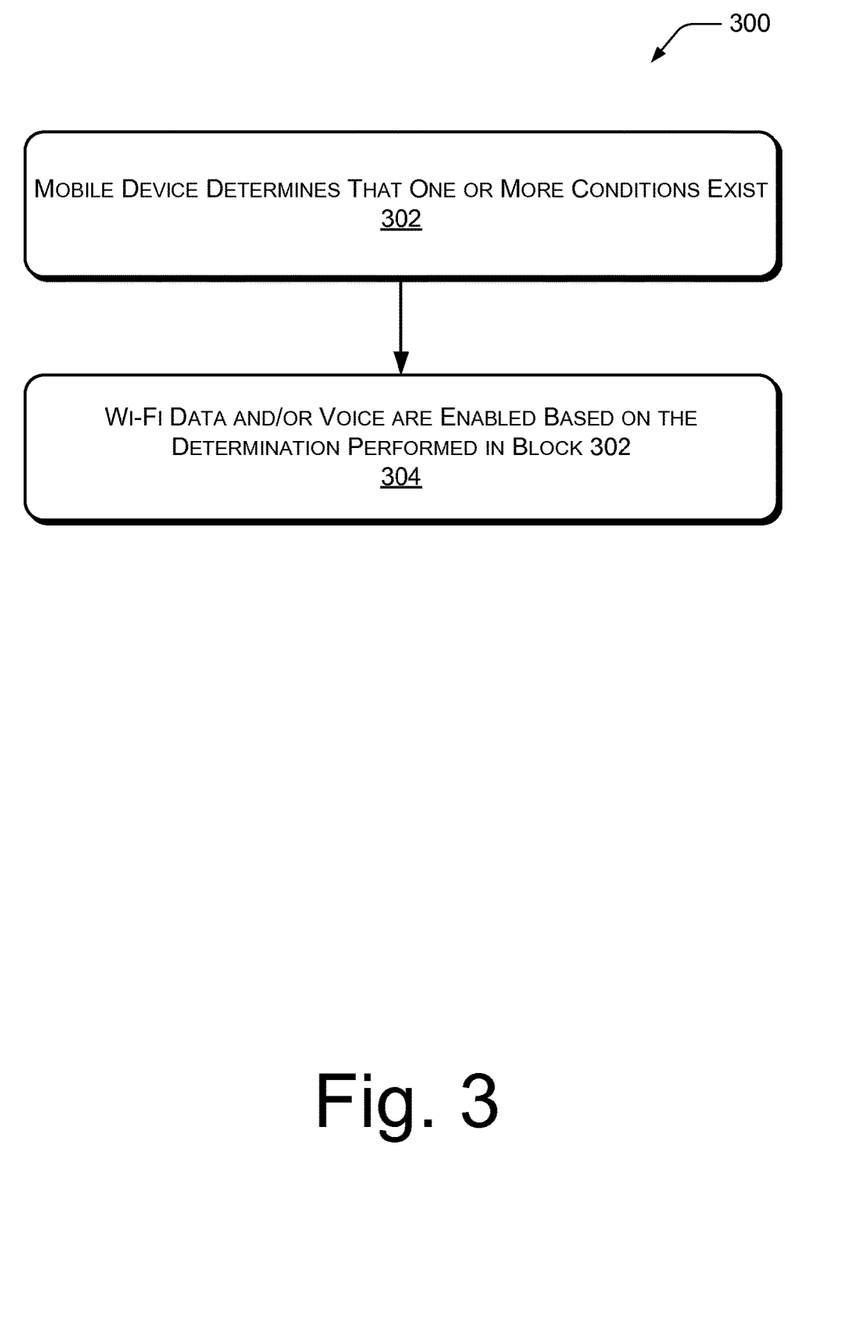
FIG. 3 is a flow diagram illustrating an example process for dynamically triggering Wi-Fi communications, according to an implementation.

FIG. 3 is a flow diagram illustrating an example process 300 for dynamically triggering Wi-Fi communications, according to an implementation. The process 300 describes a process for enabling Wi-Fi communications based on one or more conditions. The process 300 is described with reference to FIGS. 1-2.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

At block 302, one or more conditions is determined to exist. Those conditions may include detecting that a cellular signal received by a mobile device (e.g., mobile device 100) is a 2G signal, that the signal is weak, or that the signal received is likely to be lost or has been lost. Furthermore, the conditions may include determining that the mobile device is roaming, either domestically or internationally. In addition, the conditions may include receiving information that a data usage limit has been exceeded or is nearly exceeded and/or that an allocated number of voice/data minutes has been exceeded or is nearly exceeded. Other conditions may also be determined to exist, as described herein.

At block 304, Wi-Fi data and/or voice are enabled based on the determination that one or more of the conditions was determined to exist.

In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary processes discussed herein may be implemented with hardware, software, firmware, or any combination thereof. In the context of software/firmware, instructions stored on one or more processor-readable storage media that, when executed by one or more processors, may perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

Processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

What is claimed:
1. A method to enable a Wi-Fi transceiver, comprising:
receiving, by a cellular transceiver of a device, a cellular signal;

determining that a battery level of the device is above a configuration threshold;

in response to determining that the battery level is above the configuration threshold and based upon A) the cellular signal changing to a 2G signal, B) the cellular signal becoming degraded or lost, or C) a determination that the cellular signal is being received through domestic or international roaming, enabling the Wi-Fi transceiver;

establishing a Wi-Fi connection to a Wi-Fi access point via the Wi-Fi transceiver, the Wi-Fi access point being selected based on a list of known Wi-Fi access points that is received from a network operator and is stored in memory of the device; and transmitting voice communications over the Wi-Fi connection via the Wi-Fi transceiver instead of the cellular transceiver.

2. The method according to claim 1, further comprising transmitting data communications over the Wi-Fi connection via the Wi-Fi transceiver instead of the cellular transceiver.

3. The method according to claim 1, wherein the enabling of the Wi-Fi transceiver is further based on a determination that a voice minute allocation is exceeded or about to be exceeded.

4. The method according to claim 1, wherein the enabling of the Wi-Fi transceiver is delayed a predetermined time period after detection that the cellular signal has been lost.

5. The method according to claim 1, wherein the enabling of the Wi-Fi transceiver is further based on a determination that the Wi-Fi transceiver has not been manually disabled at least by one of an associated mobile device or the network operator.

6. The method according to claim 1, wherein the enabling of the Wi-Fi transceiver is further based on a determination that the device is not moving at a speed greater than a speed threshold.

7. The method according to claim 1, wherein the Wi-Fi access point is selected based on the list of known Wi-Fi access points based on a determination of a location of the device.

8. The method according to claim 1, wherein the list of known Wi-Fi access points includes a ranked listing of the known Wi-Fi access points based on historical data about the known Wi-Fi access points and/or current signal strengths associated with the known Wi-Fi access points.

9. An apparatus, comprising:
one or more processors;
a cellular transceiver;
a Wi-Fi transceiver; and
memory storing computer-executable instructions that, when executed by the one or more processors, cause the one or more processors to perform operations comprising:
enabling the Wi-Fi transceiver based upon a cellular signal event associated with a cellular signal received by the cellular transceiver, the cellular signal event being at least one of the cellular signal changing to a 2G signal, the cellular signal becoming degraded or lost, or a determination that the cellular signal is being received through domestic or international roaming;
identifying a Wi-Fi access point in a list of known Wi-Fi access points that is received from a network operator and is stored in the memory;
causing the Wi-Fi transceiver to establish a Wi-Fi connection to the Wi-Fi access point; and
transmitting voice communications over the Wi-Fi connection via the Wi-Fi transceiver instead of the cellular transceiver.

10. The apparatus according to claim 9, wherein the operations further comprise transmitting data communications over the Wi-Fi connection via the Wi-Fi transceiver instead of the cellular transceiver.

11. The apparatus according to claim 9, wherein enabling the Wi-Fi transceiver is further based on a determination that a voice minute allocation is exceeded or about to be exceeded.

12. The apparatus according to claim 9, wherein enabling the Wi-Fi transceiver is further based on a determination that the cellular signal has been lost for at least a predetermined time period.

13. The apparatus according to claim 9, wherein the enabling of the Wi-Fi transceiver is further based on a determination that when it is detected that that apparatus is not moving at a speed greater than a speed threshold.

14. The apparatus according to claim 9, wherein identifying the Wi-Fi access point in the list of known Wi-Fi access points comprises:
obtaining, from a GPS module, location information associated with the apparatus; and
selecting the Wi-Fi access point from the list of known Wi-Fi access points based on a determination that the Wi-Fi access point is within range of the Wi-Fi transceiver based on the location information.

15. The apparatus of claim 9, wherein the Wi-Fi access point is identified based on the list of known Wi-Fi access points based on a determination of a location of the apparatus.

16. The apparatus of claim 9, wherein the list of known Wi-Fi access points includes a ranked listing of the known Wi-Fi access points based on historical data about the known Wi-Fi access points and/or current signal strengths associated with the known Wi-Fi access points.

17. A method, comprising:
detecting, by a wireless communication device, a trigger event associated with a cellular connection, the trigger event being at least one of a determination that a received cellular signal is a 2G signal, a determination that the received cellular signal has become degraded, a determination that an allocated voice minute maximum has been reached, a determination that the wireless communication device is receiving the cellular signal through domestic or international roaming, or a detection of no cellular coverage;
enabling, based upon the detection of the trigger event, a Wi-Fi transceiver associated of the wireless communication device;
receiving a list of one or more ranked access points from a network operator, the one or more ranked access points having a ranking that is based at least partially on both:
historical performance data, as measured by at least one other wireless communication device; and
a present signal quality as measured by the wireless communication device;
causing the Wi-Fi transceiver to identify and connect, via a Wi-Fi connection, to one of the one or more ranked access points based on information in the list; and
transmitting voice communications via the Wi-Fi transceiver over the Wi-Fi connection with the one or more ranked access points, instead of transmitting the voice communications over the cellular connection.

18. The method according to claim 17, wherein enabling the Wi-Fi transceiver is further based on a determination that the Wi-Fi transceiver has not been manually disabled at least by one of an associated mobile device or the network operator.

19. The method according to claim 17, wherein enabling the Wi-Fi transceiver is further based on a determination that the wireless communication device is not moving at a speed greater than a speed threshold and has not moved outside a radius threshold.

20. The method according to claim 17,
wherein enabling the Wi-Fi transceiver is based on the determination that the wireless communication device is receiving the cellular signal through domestic or international roaming, and
wherein the method further comprises disabling the Wi-Fi transceiver and transmitting voice communications over the cellular connection based on a determination that the cellular signal is no longer being received through domestic or international roaming.

* * * * *